United States Patent [19]

Moslener

[11] 4,444,670

[45] Apr. 24, 1984

[54] METHOD OF MANUFACTURING MAGNETIC, PLASTIC-BONDED MOLDED BODIES

[75] Inventor: Manfred Moslener, Tangstedt, Fed. Rep. of Germany

[73] Assignee: U.S. Philips Corporation, New York, N.Y.

[21] Appl. No.: 299,257

[22] Filed: Sep. 3, 1981

Related U.S. Application Data

[63] Continuation of Ser. No. 140,941, Apr. 16, 1980, abandoned, which is a continuation of Ser. No. 938,212, Aug. 30, 1978, abandoned.

[30] Foreign Application Priority Data

Sep. 30, 1977 [DE] Fed. Rep. of Germany ....... 2743972

[51] Int. Cl.[3] ................................................ G11B 5/78

[52] U.S. Cl. ................................................ 252/62.54

[58] Field of Search ................ 252/62.54, 62.63, 62.53

[56] References Cited

U.S. PATENT DOCUMENTS 3,117,092 1/1964 Parker .............................. 252/62.54
3,184,807 5/1965 Schornstheimer et al. ..... 252/62.54 X
4,082,681 4/1978 Takayama et al. .......... 252/62.54 X
4,126,567 11/1978 Otera et al. ...................... 252/62.54

FOREIGN PATENT DOCUMENTS 548897 3/1977 U.S.S.R. .......................... 252/62.54

*Primary Examiner*—F. Edmundson
*Attorney, Agent, or Firm*—Marc D. Schechter

[57] ABSTRACT

In the manufacture of magnetic, plastic bonded molded bodies having different magnetic properties but the same physical dimensions, it has been found that variations in the amount of the magnetic mass constituent result in a change in the shrinkage behavior of the mass during and after shaping. Therefore, the shaping tools must be adapted to compensate for this varied shrinkage behavior. In order to prevent this varied shrinkage behavior, according to the invention, magnetic material in the mass is replaced by nonmagnetic inorganic material having the same or similar shrinkage behavior, the constituent of plastic remaining the same in both cases. Since the ratio of binder to material to be bonded remains constant as regards volume, in the final product, molded bodies having strongly different magnetic properties can be manufactured without having to change the shaping tool.

9 Claims, No Drawings

METHOD OF MANUFACTURING MAGNETIC, PLASTIC-BONDED MOLDED BODIES

This is a continuation of application Ser. No. 140,941, filed Apr. 16, 1980 now abandoned, which was a continuation of application Ser. No. 938,212, filed Aug. 30, 1978 now abandoned.

BACKGROUND OF THE DISCLOSURE

The invention relates to a method of manufacturing a magnetic, plastic-bonded molded body which during its manufacture can be adjusted as regards its magnetic properties. A powdered magnetic material is provided which is mixed with a plastic binder to form a mass which is then subjected to a shaping process. This shaping process may be in particular extrusion or injection molding.

During the manufacture of molded bodies from mixtures of plastic and magnetic materials, for example, plastic and ceramic powders of permanent magnetic material, two criteria are of particular importance for the user of such molded bodies:

(a) the magnetic properties, and (b) the physical (mechanical) dimensions and the size tolerances.

In a manufacturing process, the values of these criteria are selected in (a) by controlling the quantity of the component of magnetic material in the starting mass, and in (b) by accurately following the process specification during the shaping of the plastic and by accurately forming the shaping tools.

When molded bodies having different magnetic properties but having the same physical dimensions are to be manufactured, the problem arises that the tools have to be changed since, when the same plastic components are used, a change in the quantity of magnetic material in the mixture of the components causes a different shrinkage behavior of the mass during and after shaping.

Masses having different components of magnetic material thus result in products having different dimensions, when they are to be shaped by means of the same tool. Variations in the shaping conditions, such as plasticizing the mass, temperature of the mass, temperature of the tool, pressure during shaping, and pressure during the compaction step after shaping, cannot compensate for these differences to such an extent that the size of all products will lie within a uniform narrow tolerance range.

It is known that desired decreased magnetic strength of molded bodies with a given filling of magnetic material can be obtained by using fields with decreased field strengths during the magnetization of the molded bodies. However, this method has the disadvantage that the magnetization takes place in the range of the steep slope of the magnetization curve (1st quadrant of the hysteresis curve) where small fluctuations in the magnetization energy result in large tolerances in the desired magnet strength.

It is an object of the invention to solve this problem and to provide a method by means of which molded bodies having the same physical dimensions but different magnetic properties can be manufactured by means of the same tool.

SUMMARY OF THE INVENTION

In a method according to the invention, this object is achieved by adding so much of an inorganic non-magnetic filler material to the mass as is necessary to obtain a molded body of the desired magnetic properties with the volume ratio of binder to material to be bonded in the final product remaining the same.

The magnetic material is preferably a ceramic powder of permanent magnetic material, for example, barium hexaferrite powder or strontium hexaferrite powder having a grain size of from 1 to 500 $\mu$m with 65% of the number of grains less than 32 um.

Iron oxide ($Fe_2O_3$) or calcium carbonate ($CaCO_3$) may advantageously be used as a non-magnetic filler material. When choosing the magnetic material and the non-magnetic filler it should be ensured that both components have approximately the same mechanical characteristic properties, mechanical characteristic properties being understood to mean in the first instance the grain size distribution and in connection therewith the packing density and the shrinkage behavior. At any rate, equal constituents by volume of the magnetic material should be replaced in the final product by equal constituents by volume of the nonmagnetic filler.

It is also possible to process a nonmagnetic filler with a grain size distribution differing from that of the magnetic material and hence with a packing density differing from that of the magnetic material. Because the magnetic material has to be replaced by components of non-magnetic filler which correspond as regards volume in the final product, this means that with the same grain size distribution of magnetic material and non-magnetic filler, magnetic material may be replaced by non-magnetic filler in the ratio 1:1. However, in the case of unequal grain size distribution of the magnetic material and the non-magnetic filler the replacement ratio has to be calculated separately. The empirical determination of the componets of magnetic material and non-magnetic filler to be added to the mass, taking into account the material-specific parameters influencing the packing density will present no problems to those skilled in the art.

The advantages resulting from the invention are in particular that as a result of the constancy in the ratio of plastics to the other constituents of the mass (in this case: magnetic material and non-magnetic filler) as regards the volume of the final product, molded bodies with different magnetic properties can be manufactured without having to change the shaping tool. As a result of this it is possible to manufacture a magnetic molded body, having a plastic binder, with different magnetic strengths while using the same shaping tool—that is to say at minimum costs—since the part by volume of the above-mentioned constituents of the mass, hence magnetic material and non-magnetic filler, is selected at will and in accordance with the requirement of varying quantities of magnetic material and non-magnetic filler.

A further advantage is that magnetization of the molded body can always be carried out in the saturation range of the magnetization curve, which results in considerably smaller tolerance differences of the magnetic properties.

DESCRIPTION OF THE PREFERRED EMBODIMENTS

As an example of the invention, the manufacture of rings, having an outside diameter of 93 mm and an inside diameter of 70 mm by injection molding shows how desired magnetic properties of the molded bodies can be adjusted by varying the constituents of permanent magnetic material and filler in the masses with constant shrinkage. In these examples a filler was used whose mechanical characteristic properties were equal to those of the permanent magnetic powder used. A mass according to the examples of the invention is prepared so that first the plastic, for example a polyolefin, is plasticized via a thermal and compression treatment in agreement with the directions of the manufacturer of the plastic. To this plastic mass are then added the further constituents of the mass, such as ceramic permanent magnetic powder, for example barium hexaferrite powder, filler, for example $Fe_2O_3$ powder with the same grain size distribution as the ceramic permanent magnetic powder, heat stabilizers; for example β,β-thio-di-(propionic acid lauryl ester), lubricant, for example dioctylphthalate, and flame-retarding additives, for example inorganic oxides such as $Sb_2O_3$ or organic halogen compounds such as perchloropentacylodecane. Dependent on the mixing aggregate the mass is mixed to at most 30 minutes until a homogeneous distribution of all constituents is obtained, and then supplied to an extrusion press on which the compression mass is densified and compressed to thin rods of ~4 mm diameter. The extruded material is granulated and is the starting material for a subsequent injection molding process in which the final molded bodies, in this case the above-mentioned rings, are manufactured at a temperature of approximately 230° C. dependent on the plastic used. The magnetization of the molded bodies is carried out after shaping the molded bodies.

During processing of the masses according to the invention, not only the extrusion or injection molding process may advantageously be used, but also deformation and shaping methods in which powdered masses are processed and in which the molded bodies are heated after shaping may be used.

Examples 1 to 4 in the following table demonstrate how with increasing content of permanent magnetic powder—ceramic barium hexaferrite powder and strontium hexaferrite powder having a grain size of 1 to 500 μm with 65% of the grains less than 32 μm was used—and decreasing constituent of filler—iron oxide ($Fe_2O_3$) and calcium carbonate ($CaCo_3$) with the same grain size distribution as of the magnetic material was used—the remanence of the material increases with the shrinkage of the article remaining the same.

TABLE

| Example No. | 1 | 2 | 3 | 4 |
|---|---|---|---|---|
| Permanent magnetic Powder (% by weight) | 62.42 | 65.87 | 68.77 | 72.77 |
| Filler ($Fe_2O_3$, $CaCO_3$) (% by weight) | 10.35 | 6.90 | 4.00 | 0 |
| Synthetic material (Polypropylene) (% by weight) | 15.56 | 15.56 | 15.56 | 15.56 |
| Lubricant + stabilizers (Dioctylphthalate + β,β'-thio-di-propionic acid lauryl ester) (% by weight) | 2.72 | 2.72 | 2.72 | 2.72 |
| Flame retarding additions ($Sb_2O_3$, (% by weight) perchloropentacylodecane) | 8.95 | 8.95 | 8.95 | 8.95 |
| Remanence (mT) | 60 | 66 | 70 | 77 |
| Shrinkage of the article (%) | 0.9 | 0.9 | 0.9 | 0.9 |

I claim:

1. A method of manufacturing magnetic, plastic bonded molded bodies having different respective values of saturation magnetization but having the same physical dimensions, said method comprising the steps of:

A. providing a first preselected quantity by volume of a plastic binder material prepared for mixing with a material to be bonded;

B. providing a second preselected quantity by volume of a material to be bonded;

C. mixing the plastic binder and the material to be bonded to obtain a mixture; and D. processing the mixture obtained in step C into completed molded bodies by using a single shaping tool;

characterized in that the material to be bonded consists of a powdered magnetic material and an inorganic nonmagnetic filler having substantially the same shrinkage behavior, the volume ratio between the magnetic material and the nonmagnetic filler being varied from one mixture to the next to obtain different values of saturation magnetization in the completed molded bodies produced from different mixtures.

2. A method as claimed in claim 1, characterized in that the powdered magnetic material and the inorganic nonmagnetic filler having substantially the same grain size distribution.

3. A method as claimed in claim 2, characterized in that the material to be bonded consists of at least 1.3 weight percent inorganic nonmagnetic filler.

4. A method as claimed in claim 3, characterized in that the material to be bonded consists of at most 15 weight percent inorganic nonmagnetic filler.

5. A method as claimed in claim 4, characterized in that the magnetic material is a ceramic permanent magnetic powder.

6. A method as claimed in claim 5, characterized in that the ceramic permanent magnetic powder is barium hexaferrite or strontium hexaferrite powder with a grain size of 1 to 500 μm with 65% of the grains less than 32 μm.

7. A method as claimed in claim 6, characterized in that the nonmagnetic filler is iron oxide.

8. A method as claimed in claim 6, characterized in that the nonmagnetic filler is calcium carbonate.

9. A method as claimed in claim 7 or 8 characterized in that the plastic binder is a polyolefin.

* * * * *